(12) United States Patent
Dorgelo et al.

(10) Patent No.: US 8,306,636 B2
(45) Date of Patent: Nov. 6, 2012

(54) OPERATOR INTERFACE TERMINAL FOR CORRELATING DATA POINTS TO TIME POINTS

(75) Inventors: Eric Glenn Dorgelo, Port Moody (CA); Brian Alexander Wall, White Rock (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/108,965

(22) Filed: May 16, 2011

(65) Prior Publication Data
US 2011/0218651 A1  Sep. 8, 2011

Related U.S. Application Data

(63) Continuation of application No. 11/754,835, filed on May 29, 2007, now Pat. No. 7,949,413.

(51) Int. Cl.
G05B 11/01 (2006.01)
G04F 1/00 (2006.01)
G06F 17/00 (2006.01)
G06F 3/033 (2006.01)

(52) U.S. Cl. ............ 700/17; 700/83; 702/178; 715/266; 715/780; 715/866

(58) Field of Classification Search ............ 700/15, 700/16, 17, 51, 83, 96, 100–102, 105, 108–111, 700/121, 149, 174, 180, 182, 275–278, 286, 700/287, 296; 715/266, 780, 866, 965; 702/178, 702/182, 184, 188
See application file for complete search history.

(56) References Cited

U.S. PATENT DOCUMENTS 5,134,574 A * 7/1992 Beaverstock et al. ............ 702/84
6,385,497 B1 * 5/2002 Ogushi et al. .................. 700/110
6,889,096 B2 * 5/2005 Spriggs et al. .................. 700/17

* cited by examiner

Primary Examiner — Sean Shechtman
(74) Attorney, Agent, or Firm — Setter Roche LLP; Alexander R. Kuszewski; John M. Miller (57) ABSTRACT

An operator interface terminal receives individual data points from a machine at individual time points. The operator interface terminal correlates the individual data points to the individual time points as the data points are received. The operator interface terminal transfers the data points correlated to the time points to a central information system. The operator interface terminal receives a control instruction from an operator. The operator interface terminal processes the control instruction to transfer a control signal to the machine, wherein the control signal drives the machine to operate based on the control instruction.

17 Claims, 7 Drawing Sheets

| TIME | MACHINE DATA |
|---|---|
| 1 | A |
| 2 | B |
| 3 | C |
| 4 | D |
| 5 | D |
| 6 | D |
| 7 | D |
| 8 | D |
| 9 | C |
| 10 | B |
| 11 | A |

DATA 208

| TIME | MACHINE DATA | OPERATOR COMMENT |
|---|---|---|
| 1 | A | |
| 2 | B | |
| 3 | C | |
| 4 | D | |
| 5 | D | |
| 6 | D | |
| 7 | D | |
| 8 | D | OBSERVED SMOKE FROM MACHINE |
| 9 | C | |
| 10 | B | |
| 11 | A | |

DATA 208

OPERATOR INTERFACE TERMINAL FOR CORRELATING DATA POINTS TO TIME POINTS

RELATED APPLICATIONS

This application is a continuation of, claims priority to, and incorporates by reference in its entirety, U.S. patent application Ser. No. 11/754,835, entitled OPERATOR INTERFACE TERMINAL FOR CORRELATING DATA POINTS TO TIME POINTS, and filed on May 29, 2007.

BACKGROUND

Industrial plants have numerous machines that perform various tasks. These machines transfer status data to a central information system. The central information system correlates this status data to time and stores the correlated status/time data for each machine. Thus, the central information system can track the status of individual machines or aggregate data from several machines to track status at the plant level.

An operator uses an operator interface terminal to control an individual machine. The operator provides control inputs to the operator interface terminal, and the operator interface terminal processes the control inputs to transfer a corresponding control signal to the machine. The machine operates in response to the control signal. The operator interface terminal also receives status data from the machine. The operator interface terminal correlates the machine status data to time and internally stores the correlated status/time data. The operator interface terminal displays the correlated status/time data to the operator. If desired, the operator may manually retrieve the correlated status/time data from the operator interface terminal for manual transfer to the central information system.

Unfortunately, the status data that is stored in the central system may be correlated to different time points than the status data that is stored in the operator interface terminal. This time discontinuity may cause problems when comparing the status data from the operator interface terminal to the status data stored in the central information system.

SUMMARY

Embodiments of the invention include an operator interface terminal, its method of operation, and software products for use by the operator interface terminal. Embodiments of the invention include a machine control system, its method of operation, and software products for use by the machine control system.

In some embodiments of the invention, an operator interface terminal receives individual data points from a machine at individual time points. The operator interface terminal correlates the individual data points to the individual time points as the data points are received. The operator interface terminal transfers the data points correlated to the time points to a central information system. The operator interface terminal receives a control instruction from an operator. The operator interface terminal processes the control instruction to transfer a control signal to the machine, wherein the control signal drives the machine to operate based on the control instruction.

In some embodiments of the invention, the operator interface terminal displays the data points correlated to the time points to the operator. The operator interface terminal receives an operator comment correlated to one of the time points and one of the data points from the operator. The operator interface terminal transfers the operator comment correlated to the time point and the data point to the central information system.

DETAILED DESCRIPTION

Figure 1:
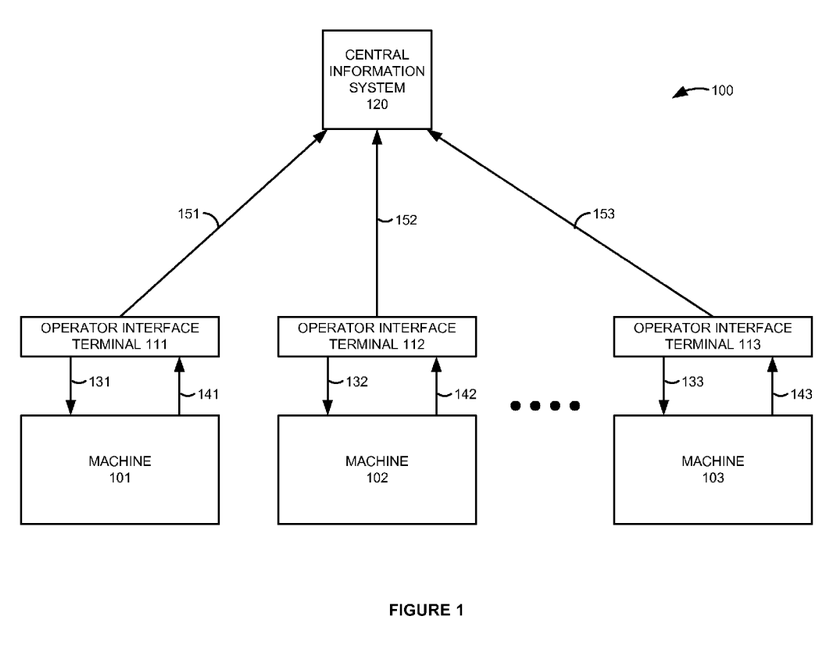
FIG. 1 illustrates a machine control system in an embodiment of the invention.

FIG. 1 illustrates machine control system 100 in an embodiment of the invention. Machine control system 100 comprises machines 101-103, operator interface terminals 111-113, and central information system 120. There would typically be additional machines and operator interface terminals than the number shown. Machines 101-103 are controlled by respective operator interface terminals 101-103. Machines 101-103 produce machine data 141-143 over time. A few examples of machines are pumps and motors, although any type of controllable machine that produces data over time could be used.

Operator interface terminals 111-113 comprise human-machine interfaces that allow human operators to control machines 101-103. An example of an operator interface terminal is the PanelView™ product line from Rockwell Automation. Other operator interface terminals are possible. Operator interface terminals 111-113 receive control inputs from their human operators and transfer corresponding control signals 131-133 to respective machines 101-103. For example, a human operator may input an instruction to operator interface terminal 111 to increase the speed of machine 101, and in response, operator interface terminal 111 would transfer control signal 131 to machine 101 that causes machine 101 to increase its speed.

Operator interface terminals 111-113 also receive data signals 141-143 from respective machines 101-103. Data signals 141-143 indicate the status of respective machines 101-103 over time. For example, data signals 141-143 could indicate the speeds of respective machines 101-103 every 5 seconds. Operator interface terminals 111-113 record the data from data signals 141-143 in correlation to the current time and date.

Operator interface terminals 111-113 display this data plotted against time to their human operators. For example operator interface terminal 111 may receive data signal 141 indicating the current speed of machine 101, and in response, terminal 111 would record that current speed along with the current time and date. Over time, operator interface terminal 111 would build a time-based log of the speed of machine 101. Operator interface terminal 111 would display a graph of the speed plotted over time to the human operator of machine 101.

Periodically, operator interface terminals 111-113 transfer data signals 151-153 to central information system 120. Data signals 151-153 indicate the data that was recorded by operator interface terminals 111-113 based on data signals 141-143. Thus, data signals 151-153 indicate the data produced by machines 101-103 correlated to time and date. Central information system 120 records the machine data correlated to time and date for all machines 101-103.

For example, every ten minutes, operator interface terminal 111 may transfer data to central information system 120 indicating the speed of machine 101 at five second intervals for the past ten minutes. Operator interfaces 112-113 would do the same for machines 102-103. Central information system 120 then records this data and can generate a single graph comparing the speeds of machines 101-103 over the last ten minutes. Central information system 120 could run enterprise historian software, such as the RSBizWare™ Historian™ software from Rockwell Automation, to collect and record the data. Other enterprise historian software is possible.

Figure 2:
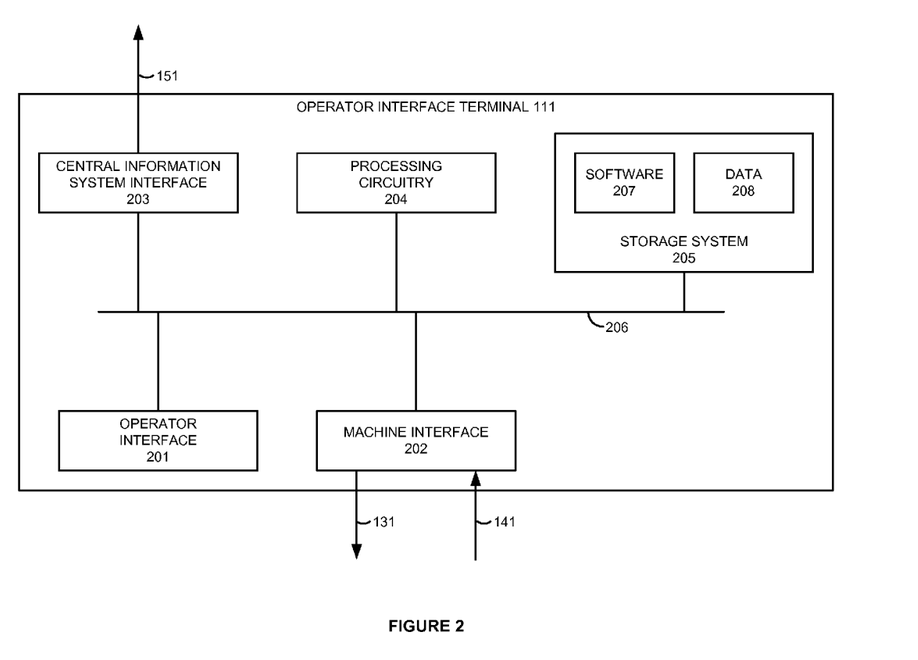
FIG. 2 illustrates an operator interface terminal in an embodiment of the invention.

FIG. 2 illustrates operator interface terminal 111 in an embodiment of the invention. Operator interface terminal 111 comprises operator interface 201, machine interface 202, central information system interface 203, processing circuitry 204, storage system 205, and communication circuitry 206. Storage system 205 stores software 207 and data 208. Communication circuitry 206 exchanges communications between interfaces 201-203, processing circuitry 204, and storage system 205. Operator interface terminals 112-113 would be configured and operate in a similar manner.

Operator interface 201 receives inputs from a human operator and transfers corresponding user instructions to processing circuitry 204. Operator interface 201 receives display information from processing circuitry 204 and displays the information to the human operator. Operator interface 201 comprises a touch screen, keypad, display, speaker, microphone, control buttons, control switches, or some other user interface. Operator interface 201 may be a single device or be distributed among multiple devices.

Machine interface 202 receives control information from processing circuitry 204 and transfers corresponding control signal 131 to machine 101. Machine interface 202 receives data signal 141 from machine 101 and transfers corresponding data to processing circuitry 204. Machine interface 202 exchanges signals 131 and 141 with machine 101 over wireless, metallic, or optical media. Machine interface 202 comprises a transceiver, port, antenna, circuitry, or some other communication components. Machine interface 202 may use Ethernet, Internet Protocol, Wireless Fidelity, or some other communication protocol. Machine interface 202 may be a single device or be distributed among multiple devices.

Central information system interface 203 receives data 208 from processing circuitry 204 and transfers corresponding data signal 151 to central information system 120. Central information system interface 203 transfers data signal 151 to central information system 120 over wireless, metallic, or optical media. Central information system interface 203 comprises a transceiver, port, antenna, circuitry, or some other communication components. Central information system interface 203 may use Ethernet, Internet Protocol, Wireless Fidelity, or some other communication protocol. Central information system interface 203 may be a single device or be distributed among multiple devices.

Processing circuitry 204 receives user instructions from operator interface 201. Processing circuitry 204 processes the user instructions to transfer corresponding control information to machine interface 202. Processing circuitry 204 receives data from machine interface 202. Processing circuitry 204 correlates the data to time and date to form data 208 and transfers data 208 to storage system 205. Processing circuitry also processes data 208 to generate display information indicating the data plotted against time and transfers the display information to operator interface 201. Periodically, processing circuitry retrieves data 208 from storage system 205 and transfers data 208 to central information system interface 203.

Processing circuitry 204 retrieves and executes software 207 from storage system 205. Software 207 comprises an operating system, utilities, drivers, networking software, application programs, firmware, or some other form of machine-readable processing instructions. When executed by processing circuitry 204, software 207 directs processing circuitry 204 to operate as described herein. Processing circuitry 204 comprises a microprocessor, logic circuitry, computer, or some other processing device. Processing circuitry 204 may be distributed among multiple devices.

Storage system 205 comprises a memory device, such as a disk, circuitry, or some other machine-readable memory apparatus. Storage system 205 may be distributed among multiple devices. Portions of storage system 205 may be external to operator interface terminal 111 in some embodiments. For example, a memory device that is external to operator interface terminal 111 may store application software that is subsequently transferred into operator interface terminal 111 to form a portion of software 207.

Figure 3:
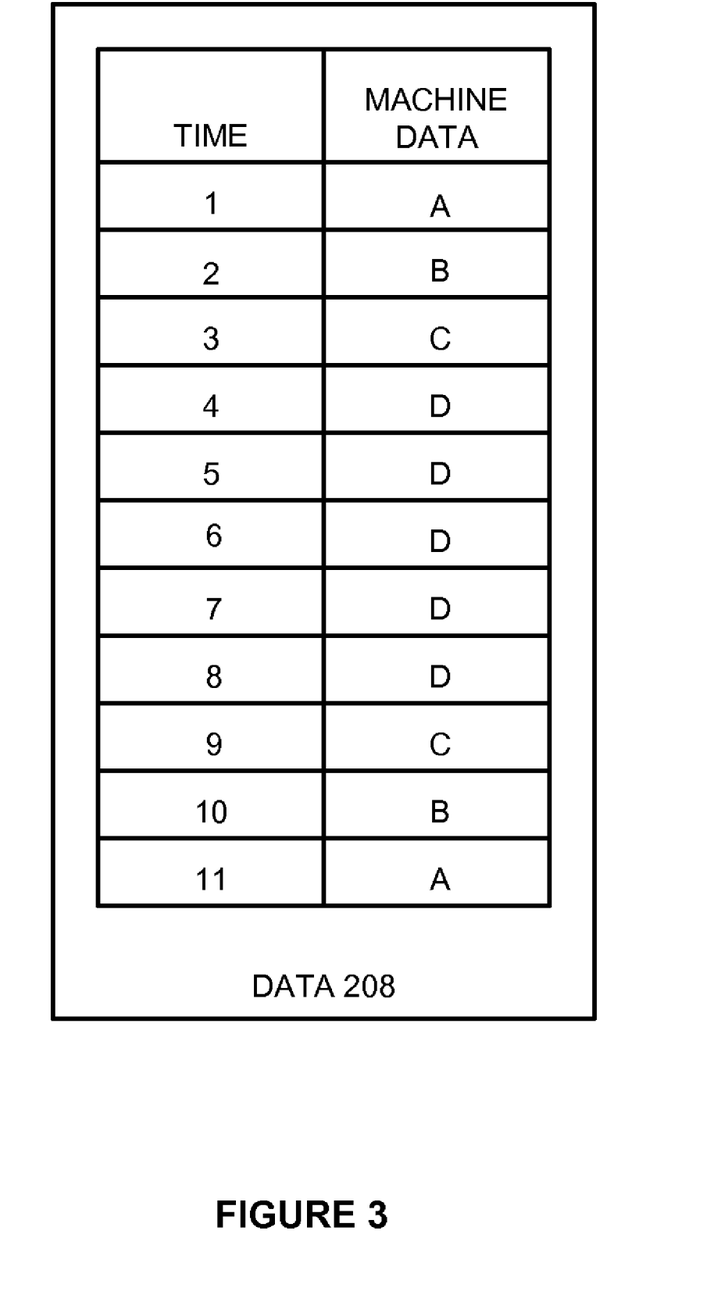
FIG. 3 illustrates machine data in an embodiment of the invention.

FIG. 3 illustrates data 208 in an embodiment of the invention. Note that data 208 has been simplified for illustrative purposes and does not represent actual machine data. Machine interface 202 receives data signal 141 from machine 101 and transfers the corresponding data points from data signal 141 to processing circuitry 204. The data points from data signal 141 indicate the status of machine 101 over time. In this embodiment, the data points are: A, B, C, D, D, D, D, C, B, A. These data points are individually received by operator interface terminal 111 at respective time points 1, 2, 3, 4, 5, 6, 7, 8, 9, 10, 11. For example, data point A is received at time point 1, data point B is received at time point 2, and so on. To form data 208, processing circuitry 204 correlates each data point to the time point when the individual data point is received. Processing circuitry then writes correlated data point and time point to data 208 in storage system 205.

Figure 4:
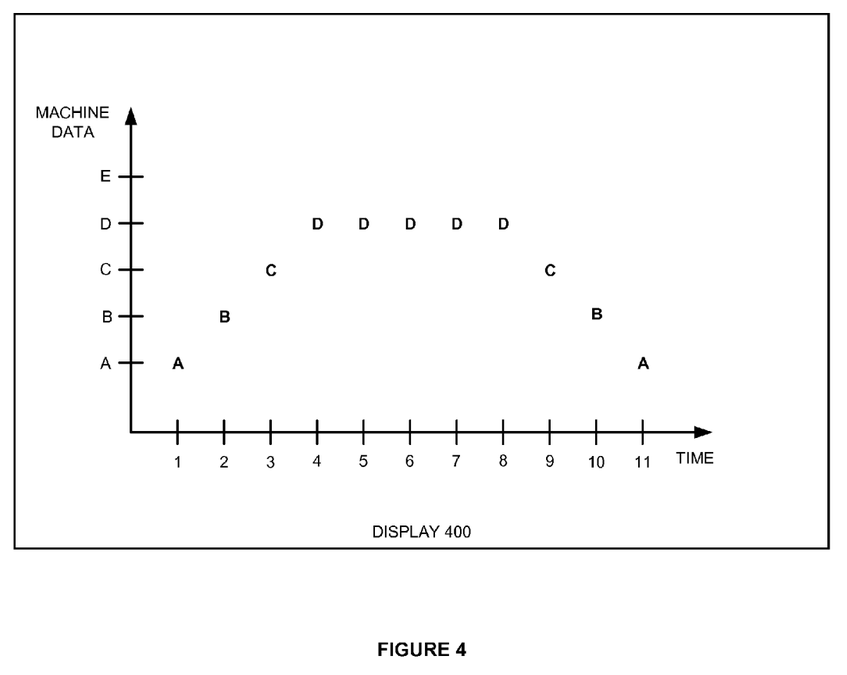
FIG. 4 illustrates a display of machine data in an embodiment of the invention.

FIG. 4 illustrates display 400 in an embodiment of the invention. Note that display 400 has been simplified for illustrative purposes and does not represent an actual display. Processing circuitry 204 processes data 208 to generate display signals for operator interface 201, and in response, operator interface provides display 400. On display 400, the horizontal axis represents time and shows time points 1-11. On display 400, the vertical axis represents machine data and shows data points A-E. Display 400 shows data 208 where the data points (A, B, C, D, D, D, D, C, B, A) are correlated to respective time points 1-11. As time goes by, time point 1 and its data point A would move off of display 400 to the left and new time point 12 with a new machine data point would move onto display 400 from the right. Central information system 120 could also provide display 400.

Figure 5:
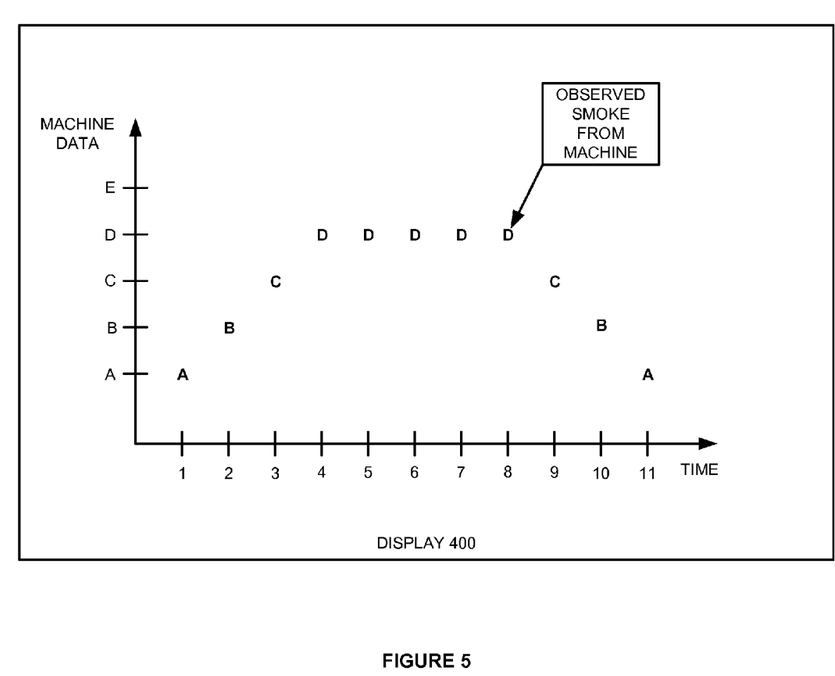
FIG. 5 illustrates a display of machine data with a correlated operator comment in an embodiment of the invention.

FIG. 5 illustrates display 400 in an embodiment of the invention. The human operator provides inputs to operator interface 201 to add the comment "observed smoke from machine" on display 400 at time point 8 and data point D. For example, the human operator may use a touch screen to type in the comment and associate the comment with time point 8 and data point D on the touch screen. Operator interface 201 transfers the operator comment in correlation with time point 8 and data point D to processing circuitry 204.

Figure 6:
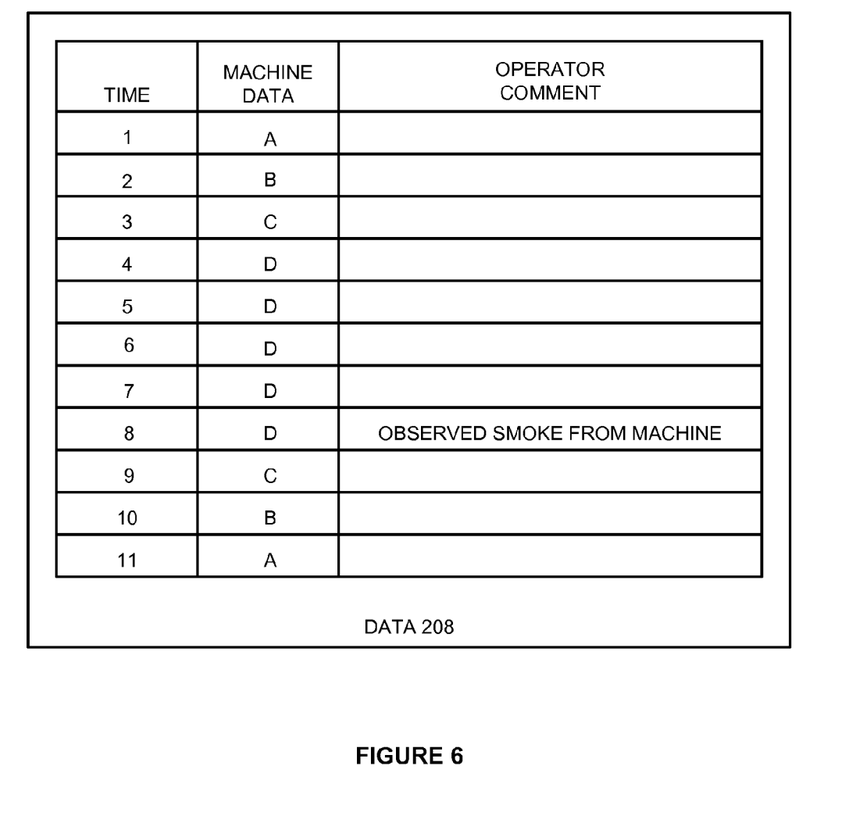
FIG. 6 illustrates machine data with a correlated operator comment in an embodiment of the invention.

FIG. 6 illustrates data 208 in an embodiment of the invention. Note that data 208 has been simplified for illustrative purposes and does not represent actual machine data. Processing circuitry 202 receives the operator comment correlated to time point 8 and data point D from operator interface 201. Processing circuitry 204 writes the operator comment to data 208 in storage system 205 in correlation to time point 8 and data point D. Subsequently, processing circuitry 204 retrieves data 208 from storage system 205 and transfers data 208 to central information system interface 203 for transfer to central information system 120. Thus, central information system 120 receives the operator comment correlated to time point 8 and data point D. Central information system 120 could provide display 400 with the correlated operator comment.

Figure 7:
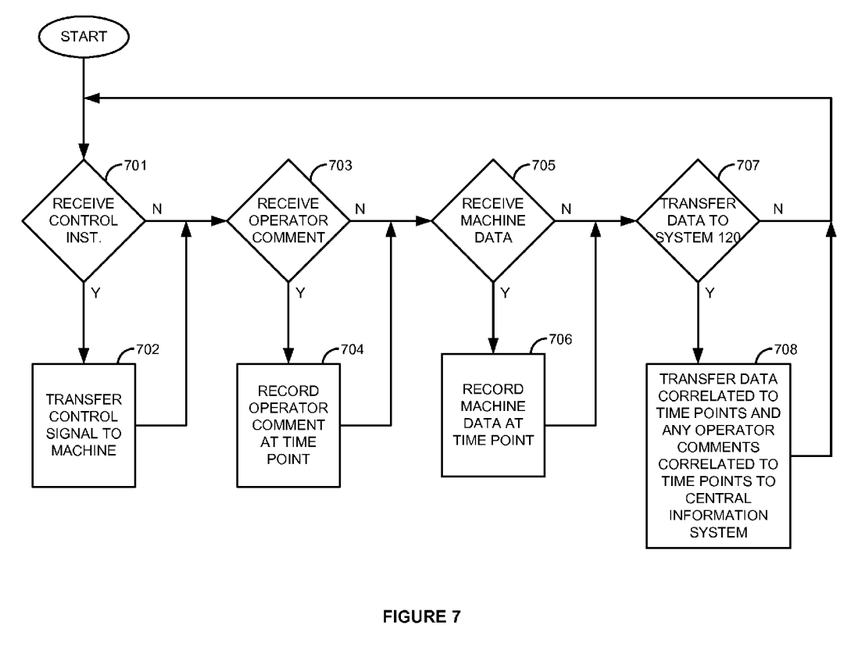
FIG. 7 illustrates the operation of an operator interface terminal in an embodiment of the invention.

FIG. 7 illustrates the operation of operator interface terminal 111 in an embodiment of the invention. The reference numbers from FIG. 7 are indicated parenthetically below. The operation starts with operator interface terminal 111 determining if a control instruction has been received from the operator (701). If a control instruction has been received from the operator (701), then operator interface terminal 111 processes the control instruction to transfer a corresponding control signal to machine 101 (702). After transferring the control signal (702) or if no control instruction has been received from the operator (701), operator interface terminal 111 determines if a comment has been received from the operator (703). If a comment has been received from the operator (703), then operator interface terminal 111 records the comment at the corresponding time point (704). After recording the operator comment (704) or if no comment has been received from the operator (703), operator interface terminal 111 determines if data has been received from machine 101 (705). If data has been received from machine 101 (705), then operator interface terminal 111 records the data at the corresponding time point (706). After recording the machine data (706) or if no data has been received from machine 101 (705), operator interface terminal 111 determines if it is time to transfer data to central information system 120 (707). If it is time to transfer data to central information system 120 (707), then operator interface terminal 111 transfers the correlated machine data, time points, and operator comments to central information system 120 (708). After operator interface terminal 111 transfers data to central information system 120 (708) or if it is not yet time to transfer data (707), operator interface terminal 111 returns to process 701. Note that the specific sequence of processes 701, 703, 705, and 707 is exemplary, and other sequences may be used in other embodiments. In addition, operator interface terminal 111 may perform some of these processes more often then others. For example, operator interface terminal 111 may check for machine data more often than it checks the time for transferring data to central information system 120.

Referring to FIG. 1, note that central information system 120 receives the machine data correlated in time from operator interface terminals 111-113. Thus, previous systems that were required to transfer the machine data from machines 101-103 directly to central information system 120 may be omitted. Note that the time correlation of the machine data in operator interface terminals 111-113 is now the same as the time correlation of the machine data in central information system 120.

Referring to FIG. 5, note that the machine data rises from time points 1-4 to reach a steady state (D) from time points 4-8. After time point 8, the machine data drops over time points 8-11. For example, the data could represent the speed of machine 101, where the machine is turned on and gets up to speed (D) from time points 1-4. The machine runs at speed (D) from time points 4-8, but then loses speed from time points 8-11. Advantageously, operator interface terminal 111 provides the operator comment to central information system 120, so management operating central information system 120 can readily determine that smoke was observed at the same time point when machine 101 began to lose speed.

Thus, operator interface terminals 111-113 correlate machine data points to time points and transfer the correlated data and time points to central information system 120. Advantageously, operator interface terminals 111-113 allow the operator to easily add comments and correlate these comments to the data points and time points. Operator interface terminals 111-113 transfer these comments correlated to data points and time points for use at central information system 120.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computer terminal in an industrial automation environment, the method comprising:
receiving data points from a machine at time points according to a first time interval, wherein the data points correspond to operation of a process within the industrial automation environment;
correlating each of the data points to a corresponding one of the time points as the data points are received;
displaying the data points correlated to the time points on a touch screen;
while the data points are being displayed, receiving a comment on the operation of the process and an instruction to correlate the comment with one of the data points through the touch screen;
storing the data points, the time points correlated to the data points, and the correlated comment; and
transferring the time points, the data points correlated to the time points, and the correlated comment to an information system periodically according to a second time interval, wherein the second time interval is greater than the first time interval.

2. The method of claim 1 further comprising displaying, via the information system, the data points correlated to the time points and the correlated comment.

3. The method of claim 1 further comprising receiving a control instruction from an operator, and processing the control instruction to transfer a control signal to the machine, wherein the control signal drives the machine to operate based on the control instruction.

4. The method of claim 3 wherein receiving the comment comprises receiving the comment from the operator.

5. The method of claim 1 wherein the machine does not transfer the data points to the information system.

6. An interface terminal comprising:
a first interface configured to receive, according to a first time interval, data points corresponding to an operation at time points of a machine within an industrial automation environment;
processing circuitry configured to correlate each of the data points to a corresponding one of the time points as the data points are received;

a touch screen configured to display the data points correlated to the time points and, while displaying the data points, receive a comment and an instruction to correlate the comment with one of the time points;

a data storage system configured to store the data points, the time points correlated to the data points, and the correlated comment; and, a second interface configured to transfer the time points, the data points correlated to the time points, and the correlated comment from the data storage system to an information system periodically according to a second time interval, wherein the second time interval is greater than the first time interval.

7. The interface terminal of claim 6 wherein:

the touch screen is configured to receive a control instruction from an operator;

the processing circuitry is further configured to process the control instruction to generate control information; and the first interface is further configured to transfer a control signal to the machine based on the control information, wherein the control signal drives the machine to operate based on the control instruction.

8. The operator interface terminal of claim 7 wherein the machine does not transfer the data points to the information system.

9. A computer readable medium having stored thereon instructions that, when executed by a computer system in an industrial automation environment, direct the computer system to:

receive data points from a machine at time points according to a first time interval, wherein the data points correspond to operation of a process within the industrial automation environment;

correlate each of the data points to a corresponding one of the time points as the data points are received;

display the data points correlated to the time points on a touch screen;

while the data points are being displayed, receive a comment on the operation of the process and an instruction to correlate the comment with one of the data points through the touch screen;

store the data points, the time points correlated to the data points, and the correlated comment; and transfer the time points, the data points correlated to the time points, and the correlated comment to an information system periodically according to a second time interval, wherein the second time interval is greater than the first time interval.

10. The computer readable medium of claim 9 wherein the instructions, when executed by the computer system, further direct the computer system to display the data points correlated to the time points and the correlated comment.

11. The computer readable medium of claim 9 wherein the instructions, when executed by the computer system, further direct the computer system to receive a control instruction from an operator, and process the control instruction to transfer a control signal to the machine, wherein the control signal drives the machine to operate based on the control instruction.

12. The computer readable medium of claim 11 wherein the comment is received from the operator.

13. The computer readable medium of claim 10 wherein the machine does not transfer the data points to the information system.

14. An operator interface terminal for use in an industrial automation environment comprising:

a machine interface configured to receive data points from a machine at time points according to a first time interval, wherein the data points correspond to operation of a process within the industrial automation environment;

processing circuitry configured to correlate each of the data points to a corresponding one of the time points as the data points are received;

an information system interface configured to receive a comment on the operation of the process; and a touch screen interface configured to display the data points correlated to the time points and display the comment correlated with one of the data points, wherein the information system interface is configured to transfer the time points, the data points correlated to the time points, and the correlated comment to an information system periodically according to a second time interval, wherein the second time interval is greater than the first time interval.

15. The operator interface terminal of claim 14 wherein the information system receives the comment from a device external to the operator interface terminal.

16. The operator interface terminal of claim 15 wherein the touch screen interface is further configured to receive a control instruction from an operator, and process the control instruction to transfer a control signal to the machine, wherein the control signal drives the machine to operate based on the control instruction.

17. The interface system of claim 14 wherein the machine does not transfer the data points to the information system.

* * * * *